(12) United States Patent
Tuineag (10) Patent No.: US 12,098,779 B2
(45) Date of Patent: Sep. 24, 2024

(54) FLOW CONTROL VALVE WITH ROLLING DIAPHRAGM

(71) Applicant: Griswold Controls, LLC, Irvine, CA (US)

(72) Inventor: Stefan I. Tuineag, Irvine, CA (US)

(73) Assignee: Griswold Controls, LLC, Irvine, CA (US)

( * ) Notice: Subject to any disclaimer, the term of this patent is extended or adjusted under 35 U.S.C. 154(b) by 120 days.

(21) Appl. No.: 17/894,872

(22) Filed: Aug. 24, 2022

(65) Prior Publication Data

US 2024/0068589 A1   Feb. 29, 2024

(51) Int. Cl.
| | |
|---|---|
| *F16K 31/126* | (2006.01) |
| *F16K 1/42* | (2006.01) |
| *F16K 5/06* | (2006.01) |
| *F16K 7/14* | (2006.01) |

(52) U.S. Cl.
CPC ............ *F16K 31/1262* (2013.01); *F16K 1/42* (2013.01); *F16K 5/0626* (2013.01); *F16K 7/14* (2013.01)

(58) Field of Classification Search
CPC ............ F16K 31/1221; F16K 31/1223; F16K 31/124; F16K 31/1262; F16K 31/1266; F16K 31/128; F16K 37/005; F16K 37/0066; F16K 37/0091
See application file for complete search history.

(56) References Cited

U.S. PATENT DOCUMENTS

| | | | |
|---|---|---|---|
| 2,619,110 A * | 11/1952 | Griswold ............... | F16K 31/124 137/488 |
| 5,271,601 A | 12/1993 | Bonzer et al. | |
| 9,920,850 B2 * | 3/2018 | Tuineag ................. | F16K 31/124 |
| 2009/0120515 A1* | 5/2009 | Ohtani ................... | F16K 5/0407 137/553 |

FOREIGN PATENT DOCUMENTS

| | | |
|---|---|---|
| CN | 200968422 | 10/2007 |
| CN | 202371285 | 8/2012 |

(Continued)

OTHER PUBLICATIONS

Machine English translation of IT1037195 (Year: 2024).*
(Continued)

*Primary Examiner* — Hailey K. Do
(74) *Attorney, Agent, or Firm* — Crockett & Crockett, PC; K. David Crockett, Esq.

(57) ABSTRACT

A flow control valve including a main valve and a pilot valve for controlling a piston of the main valve. The valve maybe controlled through a control system based upon measured pressures or temperatures in a system supplied or controlled by the valve. The valve may be operated as a pressure independent control valve, using pressure measurement from a supply line and exit line or return line of a hydronic HVAC system as inputs to the control system, which is operable to maintain a constant pressure drop across the system, or the valve may be operated as a temperature independent control valve, using temperature measurements from a supply line and exit line or return line of a hydronic HVAC system as inputs to the control system which is operable to maintain a constant temperature drop across the system.

16 Claims, 4 Drawing Sheets

(56) References Cited

FOREIGN PATENT DOCUMENTS

| | | | |
|---|---|---|---|
| CN | 2020186757 | 11/2020 | |
| CN | 214466496 | 10/2021 | |
| DE | 102017201348 A1 * | 8/2018 | ............ F02B 37/183 |
| GB | 1480960 A * | 7/1977 | ............ F16K 1/126 |
| IT | 1037195 B * | 11/1979 | ............ E21B 34/08 |

OTHER PUBLICATIONS

Machine English translation of DE102017201348 (Year: 2024).*
International Search Report and Written Opinion dated Nov. 29, 2023 from IA PCT/US2023/030259.

* cited by examiner

FLOW CONTROL VALVE WITH ROLLING DIAPHRAGM

FIELD OF THE INVENTIONS

The inventions described below relate to the field of pressure independent control valves.

BACKGROUND OF THE INVENTIONS

Current pressure independent control valves used in HVAC systems are installed in high flow applications and operate to maintain a constant pressure differential across a piping system despite fluctuations in the pressure of the fluid supply. These valves use typical valve discs and valve seats, and the valve disk position is altered by fluid pressure of fluid flowing through the valve and acting on a membrane fixed to a valve stem. Our prior U.S. Pat. No. 10,323,768 disclosed a pressure independent control valve with an electronic control system with a compact design in which major components of the valve, including the valve seat, closing element and operating chamber were contained within a compact disc-shaped valve body. This valve was operated with a flat diaphragm directly attached to the closing element.

SUMMARY

The devices described below provide for control of flow through a piping system with a valve operable as a pressure independent control valve or a temperature independent control valve. The control valve includes a main valve using a bulbous closing element operable to translate into obstructing contact against a seating element. The bulbous closing element is secured to a valve stem which is secured, directly or indirectly, to an everting sleeve or diaphragm which is operable to force the bulbous closing element against the seat when pressure is applied to the rolling diaphragm, on the side of the diaphragm opposite the bulbous closing element and the seat. The control valve also includes a pilot valve for controlling the bulbous closing element of the main valve. The main valve is controlled in part with high pressure fluid ported through a pilot valve, from a high-pressure port in the upstream surface of the valve, or an associated piping system. The pilot valve is controlled by a computer system in response to the pressure differential across the valve, or across an associated piping system (in which case it may be operated as a pressure independent module, or PIM, as that term is used in the art) or in response to a temperature differential sensed across an associated piping system (in which case it may be operated as a temperature independent module, or TIM, as that term is used in the art).

The pilot valve is operable to port high pressure fluid in the system to a chamber behind the diaphragm to force the diaphragm and bulbous closing element toward the seat, or isolate the chamber from high pressure and fluidly connect the chamber to a low pressure region in the system (allowing the fluid in the chamber to bleed off and thus allowing the diaphragm to evert to an unpressurized configuration, biased by a spring configured to force the everting sleeve or rolling diaphragm to evert, and pull the bulbous closing element away from the seat. In this manner, the main valve is operable to throttle flow through the valve, in response to pressure or temperature differentials sensed by the control system.

DETAILED DESCRIPTION OF THE INVENTIONS

Figure 1:
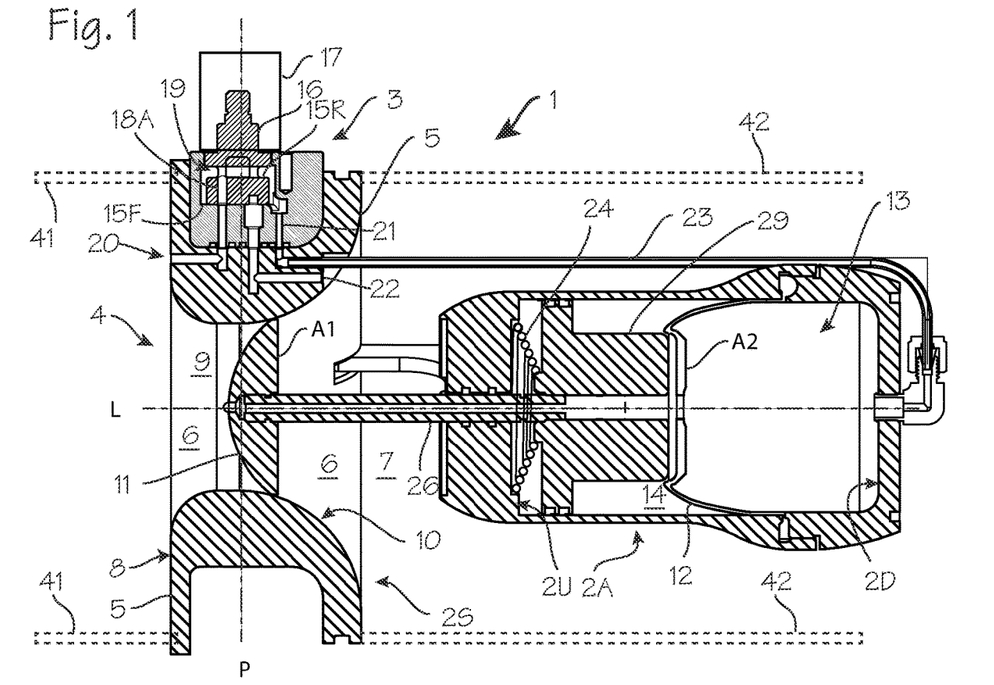
FIGS. 1, 2 and 3 are cross-sections of the flow control valve.
Figure 2:
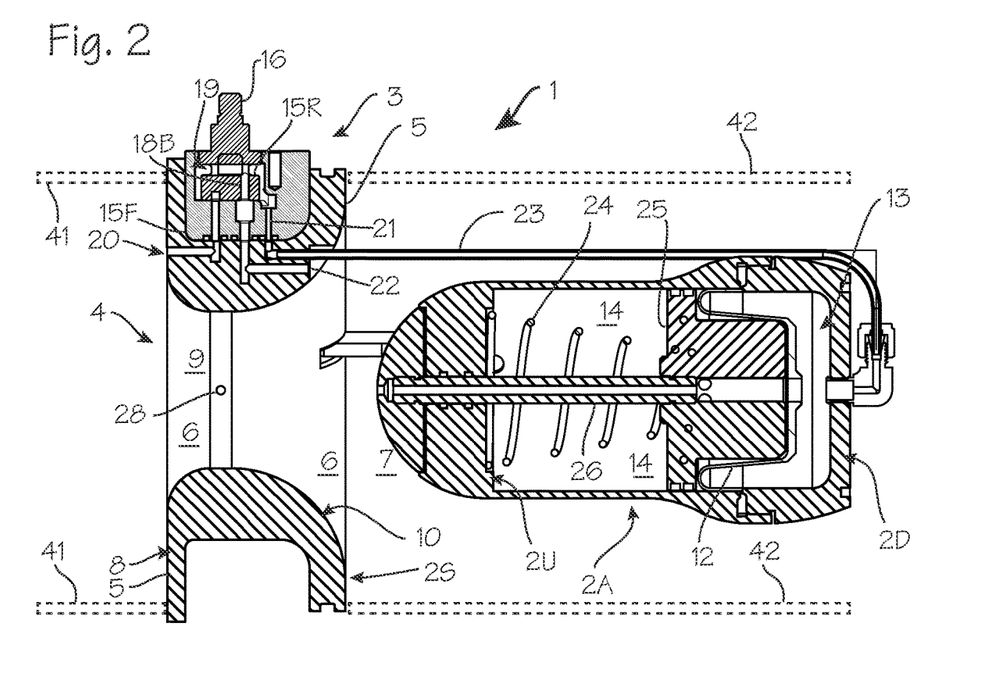
Figure 3:
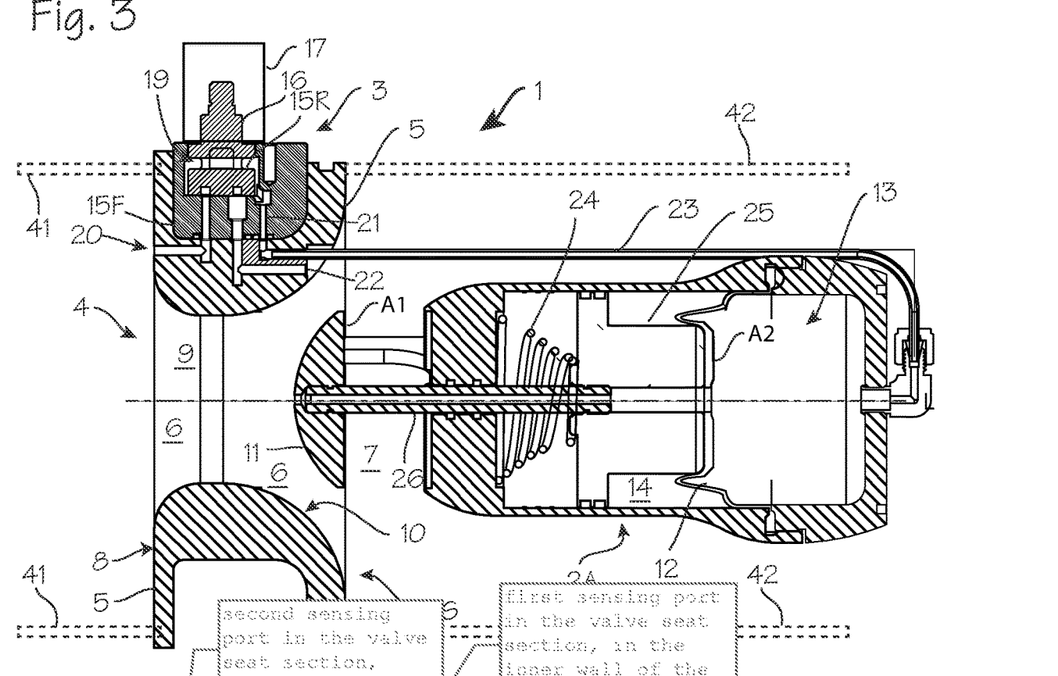

FIGS. 1, 2 and 3 illustrate a cross-section of the flow control valve 1. The flow control valve is an assembly composed of a main valve (comprising the valve seat section 2S, and an actuator section 2A) and a pilot valve 3. The main valve portion includes a main valve inlet 4, which is formed in the valve ring or valve annulus 5 comprising the valve seat section, with a bore 6 through the seat section 2S, and an outlet 7 on the outlet side of the valve seat section 2S. The inlet side of the valve, (item 8) comprises the inlet of the ring and includes the inlet aperture 9. The bore 6 extends through the valve seat section 2S and includes a beveled or flaring opening into outlet 7 to provide a seating element in the form of valve seat 10. The valve seat comprises the inner wall of the valve seat section 2S (the surface of the bore), proximate the outlet, which is sized to match the shape of the closing element 11. The closing element is a valve disc or plunger with an exterior surface (facing the valve seat) configured to seat and seal against the valve seat. As illustrated, the main valve closing element is preferably a rounded or bulbous surface, perhaps hemispherical, configured to seat against the valve seat.

The actuator section 2A is disposed downstream of the closing element 11, outside the valve seat section 2S, and not disposed within the bore 6 of the valve seat section 2S. An rolling diaphragm or everting sleeve 12, which is disposed within the actuator section, is operable to roll into an everted configuration (that is, folded back on itself) of varying extents, and secured to the valve stem at the end of the valve stem opposite the closing element. The diaphragm is operable, through operation of the pilot valve and subsequent pressurization of the main valve operating chamber 13, to resiliently revert or "unroll" longitudinally within the bore 14 of actuator 2A, toward the main valve inlet 4 (as shown in FIG. 1), to translate the closing element 11 toward the valve seat 10 and the inlet aperture to occlude (partially or fully) the bore of the valve seat section 2S to control the rate of flow through the valve seat section, and, upon depressurization of the diaphragm, to evert to a "rolled" inside-out configuration (as shown in FIG. 2) with an upstream portion of diaphragm rolled inside a downstream portion (or vice-versa, if flow through the valve is reversed vis-à-vis the description) and pull the bulbous valve disc away from the valve seat to open, or occlude less of the inlet aperture.

The pilot valve 3 depicted in the Figures includes a closing element such as rotatable ceramic disk 15R fixed to a disk drive 16 operable to rotate the rotatable disk relative to a fixed disk or flat seating surface 15F. The pilot valve may instead be a fast-acting plug valve, a ball valve, a needle valve, or other suitable valve. The valve depicted in FIG. 1 is a ceramic disk valve. The motor 17 is operable to rotate the disc, to bring an aperture (or apertures) 18A, 18B of the rotatable disc 15 into and out of alignment with the pilot valve inlet and outlet 20 and 21, to allow flow into the flow path 19 of the pilot valve. The pilot valve and its flow path are configured to provide a fluid channel for (1) pressurized fluid from the pilot valve inlet port 20 on the inlet face 8 of the valve seat section, through the bores of the disc, to the pilot valve outlet port 21 and into the main valve operating chamber 13, (2) bleeding pressure from the main valve operating chamber 13 through the operating fluid conduit 23 and relief port 22 to the outlet side 7 of the valve seat section 2S, or (3) simultaneously blocking the fluid pathways from the inlet side of the valve seat section through the pilot valve, from the outlet side of valve seat section through the pilot valve, or from the main valve operating chamber 13 to the pilot valve outlet port 22 to the outlet side 7 of the valve seat section 2S. The pilot valve may be operated in an on/off mode, as a shut off valve, or as a throttle valve or mixing valve. Most conveniently, the valve may be a ceramic disk valve comprising a fixed disk (item 15F in FIG. 1) with a closing element in the form of a rotatable disk 15R having an aperture or apertures which may be positioned into fluid communication with the operating chamber 13 through the operating fluid conduit 23, the inlet port 20, or the bleed port/pilot valve outlet port 21 to the outlet side 7 of the valve seat section 2S as necessary to increase pressure or maintain pressure in the operating chamber or relieve pressure from the operating chamber to the outlet side of the valve seat section (and, optionally, with use of a mixing valve, balance force on the face of diaphragm 12 to maintain the disk in position relative to the valve seat to maintain a desired open, closed, or throttled position of the valve). Other pilot valves, such as needle valves, cylinder or ball valves, may be used, and these may be operated as shut-off valves or throttle valves.

In operation, the main valve operating chamber 13 receives pressurized fluid from the pilot valve 3 through the pilot valve output port 21, and bleeds pressurized fluid from the main valve operating chamber 13 through the pilot valve outlet port 22 and both the supply and discharge of fluid from the operating chamber 13 may be through the single operating fluid conduit 23. The operating fluid conduit 23 serves as a pathway for operating fluid to flow to the operating chamber from the pilot valve output port 21 for translating the closing element in a first direction (closing, in the example illustrated in the figures) and as a pathway for operating fluid to bleed from the operating chamber back to the pilot valve output port 21 and hence through the relief port 22 for translating the closing element in a second direction (opening, in the example illustrated in the figures). The operating fluid conduit 23 passes from its connection to the pilot valve proximate the valve seat section to the actuator section through the open bore of the associated piping system, and is preferably not enclosed within a valve body which encloses both the valve seat section and the actuator section (though the valve seat section and actuator section may be enclosed in a housing or valve body which is fitted between the inlet and outlet pipes 41 and 42).

FIG. 1 shows the control valve in a fully closed configuration, while FIG. 2 shows the valve in a fully open configuration. In the configuration shown in FIG. 1, the pilot valve 3 is open in a first position, porting high pressure fluid from the inlet side of the valve through the pilot valve inlet port 20 on the inlet side of the valve, and through the pilot valve bore(s) 19, through the pilot valve outlet port 21, through the operating fluid conduit 23 and into the main valve operating chamber 13. With the main valve operating chamber pressurized with fluid from the inlet side of the valve, over the entire area of the face of diaphragm 12 exposed to the chamber pressure, (which area is larger than the area of the closing element 11 facing the valve seat), the diaphragm and bulbous valve disc 11 are forced toward the outlet aperture and the valve seat (despite the high pressure applied by fluid flow to the seating surface of the bulbous valve disc) to close the valve, partially or completely. In the configuration shown in FIG. 2, the pilot valve 3 is open in a second position, positioned to block high pressure fluid from the inlet side reaching the main valve operating chamber 13 while open to a flow path from the port 21 to the relief port 22, such that the fluid in the main valve operating chamber bleeds off into the outlet side of the valve through the port 21, the relief port 22 and through the operating fluid conduit 23, leading out of the operating chamber. With the main valve operating chamber de-pressurized, the diaphragm 12 and bulbous valve disc 11 are forced by the spring 24 (a compression spring) which is biased to an extended configuration, to push the piston 25 away from the inner wall of the upstream end 2U of the actuator housing and thus away from the valve seat section, and thus move (pull) the closing element away from the valve seat while causing the everting sleeve to evert further, everting back to its more completely rolled configuration, folded back on itself, as shown in FIG. 2. If the spring is not provided, the pressure of inlet fluid on the inlet side of the valve) may suffice to push the closing element 11 away from the outlet aperture and the valve seat (depending on the remaining pressure behind the diaphragm) to open the valve, partially or completely. A tension spring fixed to the piston and downstream end 2D of the actuator section 2A may be used in place of the compression spring illustrated.

FIG. 3 shows the control valve in a third, intermediate configuration, partially closed or partially open, to throttle fluid flow through the valve seat section 2S. In the configuration shown in FIG. 3, the pilot valve is "closed" in a third position, closed to both the flow path from the pilot valve inlet port 20 and the flow path to the relief port 22. Thus, high pressure fluid from the inlet side of the valve cannot enter the operating chamber, and fluid in the operating chamber cannot escape to the low pressure side of the valve, and the valve is hydraulically locked in the intermediate position. To achieve an intermediate position, the valve is operated, depending on its initial position, by porting high pressure fluid into the operating chamber 13 to push the closing element 11 toward the valve seat 2S (FIG. 1), or porting high pressure fluid out of the operating chamber 13 to allow the spring to push (or pull) the closing element 11 away from the valve seat (FIG. 2), and blocking flow into or out of the operating chamber 13 when a desired intermediate position is reached. The diaphragm may be biased to the rolled configuration with a biasing element such as the spring 24, which acts on the upstream surface 2U of the actuator cylinder to bias the diaphragm, preferably by acting on the piston 25 which is secured at a first (downstream) end to a center portion of the everting sleeve, and at a second (upstream) end to shaft 26. Pressure in the operating chamber may cause unrolling eversion of the sleeve (in the upstream direction) and translation of the piston, shaft and closing element toward the valve seat section, while relief of pressurized fluid in the operating chamber, together with expansive force of the spring may cause rolling eversion of the sleeve (in the downstream direction) and translation of the piston, shaft and closing element away from the valve seat section. The spring may be omitted if expected flow in the outlet pipe is expected to be forceful enough to force the closing element away from the valve seat section with speed sufficient for a particular use. The preferred spring shown in the Figures is a spiral compression spring, in which each turn of the spiral fits within a preceding turn, such that if completely compressed, as in FIG. 1, the spring would form a 2D spiral (a projection of the spring on the wall 2U would be a spiral), and when uncompressed, as in FIG. 2, the coils would define a cone. The spring may be a helical coil spring (isodiametric from turn to turn, such that the coils would define a circular cylinder of constant diameter, and a projection of the spring on the wall 2U would be a circle).

The valve illustrated in the figures may be operated to achieve (1) a first configuration of the valve, in which the pilot valve is configured to port high pressure fluid from the pilot valve inlet port 20 to the main valve operating chamber 13, to cause the rolling diaphragm 12 to revert to an unrolled configuration and thereby force the closing element 11 toward the valve seat section 2S as shown in FIG. 1, or (2) a second configuration of the valve, in which the pilot valve is configured to port fluid from the main valve operating chamber 13 to the relief port 22, to cause the rolling diaphragm 12 to evert to a rolled configuration and thereby force the closing element 11 away the valve seat section 2S or (3) a third configuration of the valve, in which the pilot valve is configured to block fluid flow into and out of the main valve operating chamber 13 prevent eversion or reversion of the diaphragm and thereby hydraulically lock the main valve operating chamber 13 to hold the closing element in an intermediate position relative to the valve seat section, between a fully closed position and a fully open position. Note that the terms evert and revert are chosen assuming that one surface of the diaphragm (the operating chamber side) is an inside surface and the other surface of the outside surface.

The diaphragm may comprise silicon rubber, EPDM rubber (preferably peroxide-cured), or the like, preferably reinforced with fiber. The closing element may comprise a hard, non-conforming material (metal or plastic) or a resilient material. The inlet aperture 9, seating element 10, closing element 11, bore 6, diaphragm 12, and operating chamber 13 are preferably aligned along a common longitudinal axis L, generally perpendicular to the plane P established by the disk, passing through the valve. As shown in the Figures, the common longitudinal axis L is preferably centered in the flow path of surrounding piping 41, so that each component is centered relative to the bore 6 of the valve and aligned along the central longitudinal axis of the valve seat section. As shown in the drawings, the diaphragm is configured to evert, or roll into an outside-in configuration (like a rolled-up shirt sleeve), as shown in FIG. 2, and revert, or unroll to an un-everted configuration as shown in FIG. 1.

Figure 4:
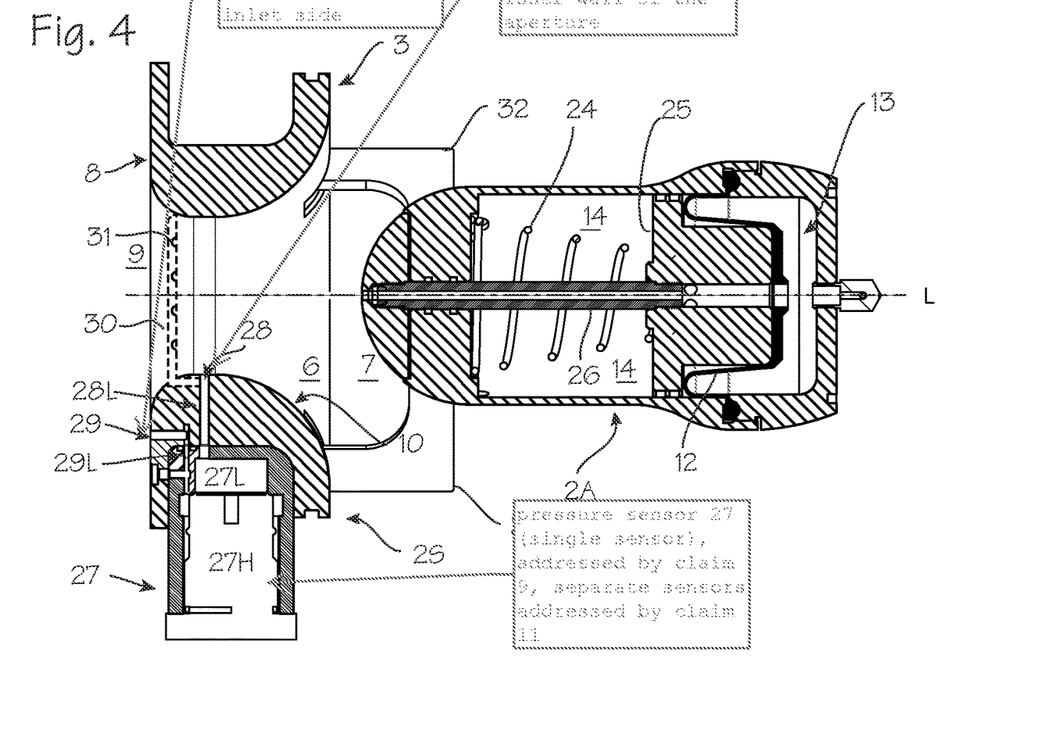
FIG. 4 is a cross-section of the flow control valve, showing Venturi sensing elements useful to control the valve.

FIG. 4 is a cross-section of the flow control valve, showing Venturi sensing elements useful to control the valve. This view shows the valve 1 with its main valve comprising the valve seat section 2S, the actuator section 2A, the inlet aperture 9 on the inlet side of the valve seat section 2S (item 8), the bulbous valve disc 9, diaphragm 12 and main valve operating chamber 13 and other components. The pilot valve is not visible in this cross-section.

FIG. 4 shows a pressure sensor, such as a differential pressure transducer 27, in fluid communication with a low-pressure sensing port 28 disposed in the inlet aperture inner wall of the bore of the valve annulus 5 comprising the valve seat section, downstream of the inlet aperture 9. This sensing port communicates through low-pressure sensing line 28L to the pressure sensor 27. A high pressure sensing port 29 on the inlet face of the valve, exposed to inlet fluid pressure, communicates through high pressure sensing line 29L with the pressure sensor 27. The bevel of the inlet aperture may be shaped such that the inlet aperture forms a Venturi or orifice plate with which the flow rate through the valve may be measured, using input from the pressure sensor 27 sensing (1) inlet pressure through inlet pressure sensing port 29 as the high-pressure input and (2) pressure from the low pressure sensing port 28 as a low pressure input for calculation of flow rates through the valve. The bore defines a central radial portion of the valve seat section, and the remainder of the valve seat section defines an outer radial portion of the valve seat section, and the valve seat section is characterized by a side wall circumscribing the valve seat section, and the valve further comprises a pressure sensor 27 disposed in the outer radial portion, and ports 28, 29, or other port disposed on the valve seat section, exposed to fluid flow and in fluid communication with the sensor. The pressure sensors may be configured in a sensor assembly comprising a separate high pressure sensor 27H and low pressure sensor 27L, and may be inserted into a radially oriented bore in the valve seat section, with a first pressure sensing port 28 opening into the inlet aperture, and a first sensing line 28L running through the valve seat section to a first pressure sensor 27L and a second pressure sensing port 29 opening into the inlet side of the valve, and a second sensing line 29L running through the valve seat section to a second pressure sensor 27H.

Low pressure sensing may be improved, especially for low flow configuration of the valve which result in high turbulence near the longitudinal center of the valve seat section, or small diameter area of the Venturi configuration, by adding a conduit 30, extending radially across the bore of the valve, in a low pressure region suitable for receiving low pressure input for the Venturi pressure sensor, and in fluid communication with the low pressure regions through one or several ports 31 in the conduit which open the bore of the valve seat section in a low pressure region of the flow through the valve.

The valve, as illustrated, comprises a discrete valve seat section and a discrete actuator section, without a valve body or casing through which fluid flows. The valve can be installed in piping with the actuator section disposed within the outlet segment of the piping. The actuator section is disposed and fixed in axial alignment with the valve seat section with one or more supports 32 or other convenient means. The valve seat section is configured such that a longitudinal axis L of the bore is aligned, when installed in a piping system (with the valve seat section between the inlet pipe and the outlet pipe shown also in the Figures), with a longitudinal axis of the immediately surrounding piping system, and the one or more supports are configured to fix the actuator section in the piping system, spaced from the valve seat section, such that the inlet aperture, closing element, diaphragm and operating chamber are aligned along the longitudinal axis L of the valve seat section, with the actuator section suspended within the piping system. The operating fluid conduit comprises the tube 23 which provides a fluid pathway from the pilot valve outlet port to the main valve operating chamber within the actuator section. This tube extends externally from the valve seat section to the main valve operating chamber. The valve seat section, actuator section, and tube are not enclosed within a discrete valve body, and the tube passes through a portion of the piping system, external to the valve seat section and actuator section.

Figure 5:
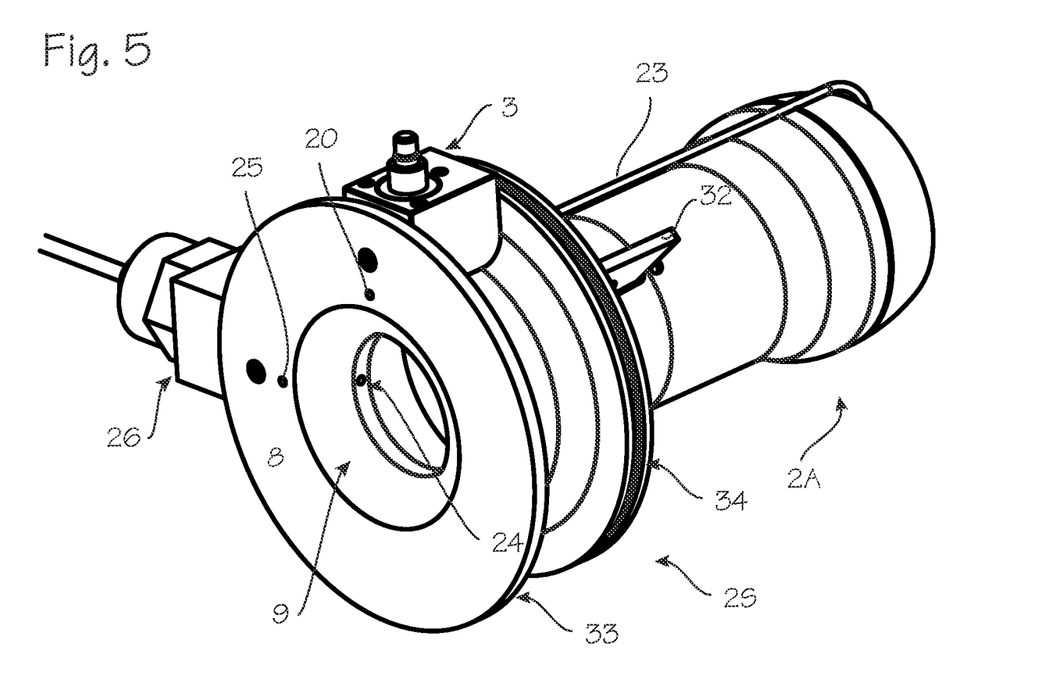
FIG. 5 is a perspective view of the valve.

FIG. 5 is a perspective view of the flow control valve 1, including the valve seat section 2S, the valve actuator 2A and the supports 32 connecting the two, and the pilot valve 3. This view also shows the inlet side 8 of the valve seat section, the inlet aperture 9, and the pilot valve inlet port 20.

The first sensing port 29 (for inlet pressure sensing) and the low-pressure sensing port 28. As shown in FIG. 5, The pilot valve 3 and the pressure sensor assembly 27 may be conveniently disposed on the valve ring 5 (in the valve seat section 2S, between the inlet side flange 33 and outlet side flange 34 which are used to fix the valve to an associated piping system). The control system 35 (FIG. 6) is operably connected to the various inputs and sensors, for receiving signals corresponding to the pressure(s) sensed by the sensors, and is also operably connected to the motor 17, for operating the pilot valve. The control system may control the pilot valve, and thus the main valve, in response to the flow through the valve as determined by the control system based on sensed pressures from the ports of the Venturi, or temperature at various points in the associated piping system, or in response to other input from additional sensors, or response to manual input from an operator. The control system may be disposed between the flanges of the valve, without protruding beyond the circumference of the flanges, or it may be remotely located. The pressure sensor is shown disposed within a peripheral region of the valve, with the pressure sensor port communicating from the pressure sensor ports. A temperature sensor may also be disposed within a peripheral region of the valve, with a temperature sensor port communicating from the inlet or outlet side of the valve (or other location) to the temperature sensor.

The valve can be used as a PIM, using the pilot valve to control flow through the valve to maintain a constant pressure drop across the valve itself, or to maintain a constant pressure drop across an associated piping system. A control system is shown schematically in FIG. 6. This control system is programmed to accept signals from the low-pressure sensor 27L and high-pressure sensor 27H, corresponding to the pressure sensed by each sensor, and determine the pressure differential between the associated sensing ports 28 and 29, and compare the determined pressure differential to a predetermined pressure differential, and then, conditionally, cause energization of the pilot valve motor to open or close (or throttle) the pilot valve as necessary to close or open the main valve to maintain a sensed pressure differential which matches the predetermined pressure differential (within an acceptable band close to the predetermined pressure differential). The predetermined pressure differential may be preset when the system is manufactured, or entered into the control system by an installer or user.

To maintain a constant pressure drop across the valve itself, the control system and sensors built into the valve may be used. To maintain a constant pressure drop across an associated piping system, pressure sensors disposed in the associated system can be used, and may include a high-pressure sensor at the input of the associated piping system and a low-pressure sensor at the output of the associated piping system. If the valve is installed downstream of the associated piping system, the sensor 27 may be used to sense high pressure when the valve is used in isolation may be used as the low-pressure sensor of the associated piping system. If the valve is installed upstream of the associated piping system, the sensor 28 used to sense high pressure when the valve is used in isolation may be used as the high-pressure sensor of the associated piping system, and a low-pressure sensor at the outlet of the associated piping system may be used by the control system as the low-pressure sensor.

Figure 6:
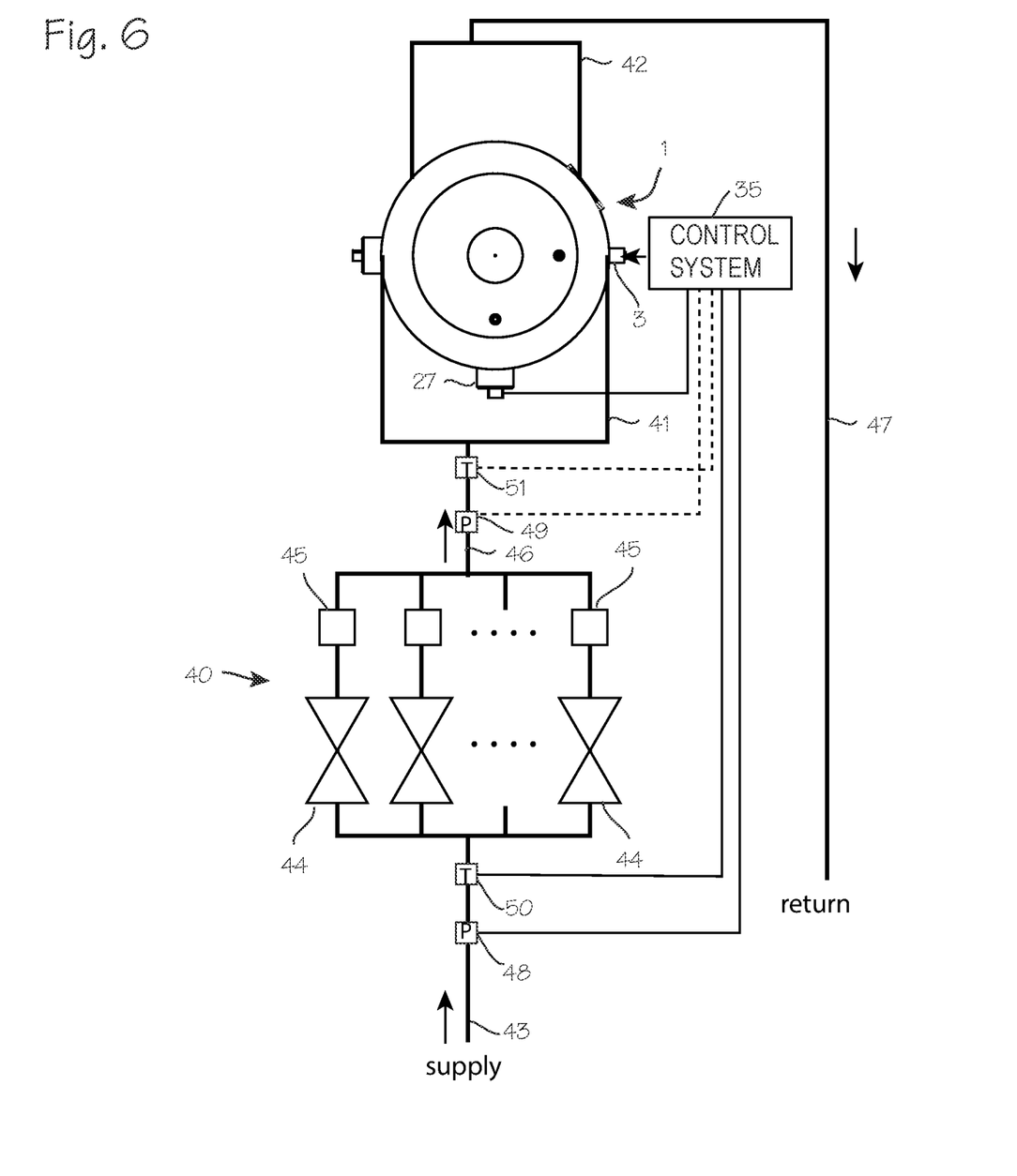
FIG. 6 is a schematic of a piping system, such as an HVAC system, in which the valve of FIG. 1 may be used.

The valve can be used as a temperature independent control valve or temperature independent module (TIM), using the pilot valve to control flow through the valve to maintain a constant temperature drop across an associated piping system. To operate as a temperature independent control valve or temperature independent module (TIM), the control system shown in FIG. 6 is programmed to accept signals from temperature sensors in the associated piping system, corresponding to the temperature sensed by each sensor, and determine the temperature differential between the associated temperature sensor, and compare the determined temperature differential to a predetermined temperature differential, and then, conditionally, cause energization of the pilot valve motor to open or close (or throttle) the pilot valve as necessary to close or open the main valve to maintain a sensed temperature differential which matches the predetermined temperature differential (within an acceptable band close to the predetermined temperature differential). The predetermined temperature differential may be preset when the system is manufactured, or entered into the control system by an installer or user.

FIG. 6 illustrates an overall piping system, with the valve 1 controlling flow through an associated piping system 40, such as an HVAC system, in which the valve of FIG. 1 may be used. The valve is installed in a piping system, with an upstream inlet pipe 41 and a downstream outlet pipe 42, establishing respective upstream and downstream sides of the flow control valve. The system may include a supply line 43, any number of branch valves 44 in various branches used to adjust flow to various loads 45, and an outlet line 46 (which is an initial portion of the return line). The control valve 1 is installed in the return line, comprising outlet line 46, the upstream and downstream pipes 41 and 42, and the remainder of the return line (item 47). In an HVAC system, the branch valves may be inexpensive pressure independent control valves (such as Griswold PIC-V®, MVP® and PIM valves), manually operated ball valves or throttle valves, or other valves, and the loads might be individual heat exchangers or rooms to be supplied with fluid through a main supply pipe, a manifold or a bank of branch valves. When used as a PIM to control flow through an associated piping system, the high pressure input is taken from a pressure sensor 48 on the supply line 43, and the low pressure input may be taken from the pressure sensor 49 which is disposed proximate the inlet of the valve, or in the valve (which serves as the high-pressure sensor when the valve is used to control the pressure drop across the valve itself) or from a pressure sensor disposed in the return line of the associated piping system.

When used as a temperature independent control valve or temperature independent module (TIM) to control flow through an associated piping system (an HVAC cooling system, in this case), the inlet temperature input is taken from a temperature sensor 50 on the supply line 43, and the outlet temperature input may be taken from the temperature sensor 51 disposed on the outlet of the associated piping system or from a temperature sensor disposed in the return line of the associated piping system. (When used for cooling, the temperature sensor 50 will be used as a high temperature sensor, and the temperature sensor 51 will be used as a low temperature sensor.) The valve may be operated in another mode, in which the valve is throttled as necessary to maintain temperature at the outlet of the associated piping system, without regard to the temperature differential across the system.

When used to control flow across a piping system, the control system is operable to control the pilot valve, and the control system is operable to receive signals from first and second sensors pertaining to fluid in a system controlled by the valve, and control the pilot valve to in turn control the main valve, to in turn control flow through the valve in response to the signals from the first and second sensors. The respective sensors may be disposed proximate the outlet of the piping system (the return line) and the inlet of the piping system (the supply line), with the loads between the inlet and outlet. Sensors within the valve may be used as either input sensors or output sensors, depending on the position of the valve within the piping system.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. A flow control valve comprising:
a main valve comprising a valve seat section comprising:
an inlet aperture (9) and an outlet aperture (7) and a bore (6) extending from said inlet aperture to said outlet aperture (9), said outlet aperture (7) forming a valve seat (10);
a closing element (11), and
an actuator section (2A) operable to move the closing element (11) into and out of, or toward and away from, occluding relationship with the valve seat (10);
said actuator section (2A) comprising a rolling diaphragm (12) secured to the closing element (11), said rolling diaphragm (12) forming a main valve operating chamber (13) within the actuator section (2A) which is operable through pressurization of said main valve operating chamber (13) to translate the closing element (11), wherein said rolling diaphragm (12) is disposed within the actuator section (2A);
the actuator section (2A) secured to the valve seat section (2S) through one or more supports (32), such that the actuator section (2A) is disposed downstream from the valve seat section (2S) and is spaced from the valve seat section (2S);
a pilot valve (3) disposed within the valve seat section (2S), with a pilot valve inlet port (20) open to an inlet side (8) of valve seat section (2S), said pilot valve inlet port (20) in fluid communication, through the pilot valve, with the main valve operating chamber (13), said pilot valve being operable to control flow of fluid from the inlet side (8) of the valve seat section (2S) to the main valve operating chamber (13); wherein
the valve seat section (2S) is configured such that a longitudinal axis (1) of the bore is aligned, when installed in a piping system (40), between an inlet pipe and an outlet pipe, with a longitudinal axis of said piping system, and the one or more supports (32) are configured to fix the actuator section (2A) in said piping system (40), spaced from the valve seat section (2S), such that the inlet aperture (9), closing element (11), rolling diaphragm (12) and main valve operating chamber (13) are aligned along a longitudinal axis of the valve seat section (2S); and further comprising
a tube (23) providing a fluid pathway from the pilot valve outlet port (21) to the main valve operating chamber (13) within the actuator section (2A), said tube extending externally from the valve seat section (2S) to the main valve operating chamber (13), wherein the valve seat section, actuator section, and tube are not enclosed within a valve body.

2. The flow control valve of claim 1, wherein:
in a first configuration of the flow control valve, the pilot valve is configured to port high pressure fluid from the pilot valve inlet port (20) to the main valve operating chamber (13), to cause the rolling diaphragm (12) to evert and thereby force the closing element (11) toward the valve seat section (2S).

3. The flow control valve of claim 1, wherein the longitudinal axis of the valve seat section is a central longitudinal axis of the valve seat section.

4. The flow control valve of claim 1 wherein the bore defines a central radial portion of the valve seat section, and a remainder of the valve seat section defines an outer radial portion of the valve seat section, and the valve seat section is further characterized by a side wall circumscribing the valve seat section, and the flow control valve further comprises:
a sensor disposed in the outer radial portion; and
a port disposed on the valve seat section, exposed to fluid flow and in fluid communication with the sensor.

5. The flow control valve of claim 1, wherein the closing element is a bulbous disk sized and dimensioned to seat against the valve seat and control flow through the valve seat section.

6. A flow control valve and control system assembly comprising:
the flow control valve of claim 1;
a first sensor and a second sensor; and
a control system operable to control the pilot valve, said control system operable to receive signals from the first and second sensors pertaining to fluid in a system controlled by the flow control valve, and control the pilot valve to in turn control the main valve, to in turn control flow through the flow control valve in response to the signals from the first and second sensors.

7. An HVAC system and flow control valve comprising:
the flow control valve of claim 1;
a first sensor and a second sensor;
a control system operable to control the pilot valve, said control system operable to receive signals from the first and second sensors pertaining to fluid in a system controlled by the flow control valve, and control the pilot valve to in turn control the main valve, to in turn control flow through the flow control valve in response to the signals from the first and second sensors; and
a piping system comprising a supply line, a return line, and at least one load between the supply line and the return line;
wherein:
the first sensor is a pressure sensor in fluid communication the supply line;
the second sensor is a pressure sensor in the return line;
the flow control valve is disposed in the piping system, in the supply line or return line; and
the control system is programmed to control flow through the flow control valve to maintain a predetermined pressure differential between the first and second sensor.

8. An HVAC system and flow control valve comprising:
the flow control valve of claim 1;
a first sensor and a second sensor;
a control system operable to control the pilot valve, said control system operable to receive signals from the first and second sensors pertaining to fluid in a system controlled by the flow control valve, and control the pilot valve to in turn control the main valve, to in turn control flow through the flow control valve in response to the signals from the first and second sensors; and a piping system comprising a supply line, a return line, and at least one load between the supply line and the return line;

wherein:

the first sensor is a temperature sensor operable to sense temperature of fluid in the supply line;

the second sensor is a temperature sensor operable to sense temperature of fluid in the return line;

the flow control valve is disposed in the piping system, in the supply line or return line; and the control system is programmed to control flow through the flow control valve to maintain a predetermined temperature differential between the first and second sensor.

9. The flow control valve of claim 1 wherein the inlet aperture comprises an opening in the inlet side of the flow control valve characterized by an inlet aperture inner wall circumscribing the inlet aperture and proximate the inlet, and said flow control valve further comprises:

a pressure sensor (27);

a first pressure sensing port (28) disposed in the inlet aperture inner wall and in fluid communication with the pressure sensor (27);

a second pressure sensing port 29 disposed on the inlet side of the valve seat section (2S) and in fluid communication with the pressure sensor (27);

whereby the pressures sensed by the pressure sensor (27) through the first pressure sensing port (28) and through the second pressure sensing port 29 may be used to measure flow through the flow control valve.

10. The flow control valve of claim 9, further comprising:

a first temperature sensor disposed within a peripheral region of the flow control valve, and a temperature sensor port communicating from the inlet or outlet side of the flow control valve to the temperature sensor.

11. The flow control valve of claim 1, further comprising:

a first pressure sensing port (28) opening into the inlet aperture, and a first sensing line (28L) running through the valve seat section to a first pressure sensor (27L); and a second pressure sensing port (29) opening into the inlet side of the flow control valve, and a second sensing line (29L) running through the valve seat section to a second pressure sensor 27H.

12. The flow control valve of claim 11, wherein the first pressure sensor (27L) is disposed within a peripheral region of the valve seat section, in a radially oriented bore running parallel to a plane defined by the valve seat section and the second pressure sensor (27H) is disposed within the peripheral region of the valve seat section, in a radially oriented bore running parallel to the plane defined by the valve seat section.

13. The flow control valve of claim 1, wherein:

the pilot valve (3) further comprises a pilot valve outlet port (21) open to a relief port (22) on an outlet side (7) of the valve seat section (2S), said relief port (22) in fluid communication, through the pilot valve, with the main valve operating chamber (13), said pilot valve being operable to control flow of fluid from the main valve operating chamber (13) to the outlet side (7) of the valve seat section.

14. The flow control valve of claim 13, wherein:

in a second configuration of the flow control valve, the pilot valve is configured to port fluid from the main valve operating chamber (13) to the relief port (22), to cause the rolling diaphragm (12) to evert and thereby force the closing element (11) away from the valve seat section (2S).

15. The flow control valve of claim 13, wherein:

in a first configuration of the flow control valve, the pilot valve is configured to port high pressure fluid from the pilot valve inlet port (20) to the main valve operating chamber (13), to cause the rolling diaphragm (12) to evert and thereby force the closing element (11) toward the valve seat section (2S).

16. The flow control valve of claim 15, wherein:

in a third configuration of the flow control valve, the pilot valve is configured to block fluid flow into and out of the main valve operating chamber (13) prevent eversion of the rolling diaphragm and thereby hydraulically lock the main valve operating chamber (13) to hold the closing element in an intermediate position relative to the valve seat section.

* * * * *